(12) United States Patent
Moran et al.

(10) Patent No.: US 6,536,715 B1
(45) Date of Patent: Mar. 25, 2003

(54) INFLATABLE EVACUATION SLIDE WITH ARCH SUPPORT

(75) Inventors: Marc H. Moran, Colts Neck, NJ (US); Dean H. Staudt, Lakewood, NJ (US); John W. O'Donnell, Sea Girt, NJ (US)

(73) Assignee: Air Cruisers Company, Wall, NJ (US)

( * ) Notice: Subject to any disclaimer, the term of this patent is extended or adjusted under 35 U.S.C. 154(b) by 0 days.

(21) Appl. No.: 09/882,436

(22) Filed: Jun. 15, 2001

(51) Int. Cl.[7] ............................................. B64D 25/14
(52) U.S. Cl. ...................... 244/905; 244/137.2; 182/48; 193/25 B
(58) Field of Search ..................... 244/905, 137.2; 182/48; 193/25 B

(56) References Cited

U.S. PATENT DOCUMENTS

| | | | | |
|---|---|---|---|---|
| 3,370,684 A | * | 2/1968 | Holcombe | |
| 3,726,375 A | * | 4/1973 | Blate et al. | |
| 3,811,534 A | * | 5/1974 | Fisher | |
| 3,833,088 A | * | 9/1974 | Chacko et al. | |
| 4,018,321 A | | 4/1977 | Fisher | |
| 4,434,870 A | * | 3/1984 | Fisher | |
| 4,519,782 A | * | 5/1985 | Fisher | |
| 4,723,628 A | * | 2/1988 | Fisher | |
| 4,846,422 A | | 7/1989 | Fisher | |
| 5,875,868 A | | 3/1999 | Smialowicz et al. | |
| 5,967,254 A | | 10/1999 | Lutzer | |
| 5,975,467 A | * | 11/1999 | O'Donnell et al. | |
| 6,298,970 B1 | | 10/2001 | Targiroff et al. | |

FOREIGN PATENT DOCUMENTS

| | | | | |
|---|---|---|---|---|
| DE | 1804219 | * | 7/1970 | .................. 244/905 |
| GB | 1206936 | * | 9/1970 | .................. 244/905 |

* cited by examiner

*Primary Examiner*—Tien Dinh
(74) *Attorney, Agent, or Firm*—Lawrence G. Fridman

(57) ABSTRACT

An inflatable evacuation device includes an inflatable slide portion and an inflatable arch-shaped support portion for supporting the inflatable slide portion. The inflatable slide portion has a support frame with a first inflatable elongate beam and a second inflatable elongate beam spaced from the first inflatable elongate beam. A floor extends between the first and second inflatable elongate beams and is constructed of a flexible material. The inflatable arch-shaped support portion comprising first and second inflatable curved beams connected to the inflatable slide portion such that forces generated at least at a central region of the inflatable slide portion are transferred to the curved beams to thereby support at least the central region.

27 Claims, 14 Drawing Sheets

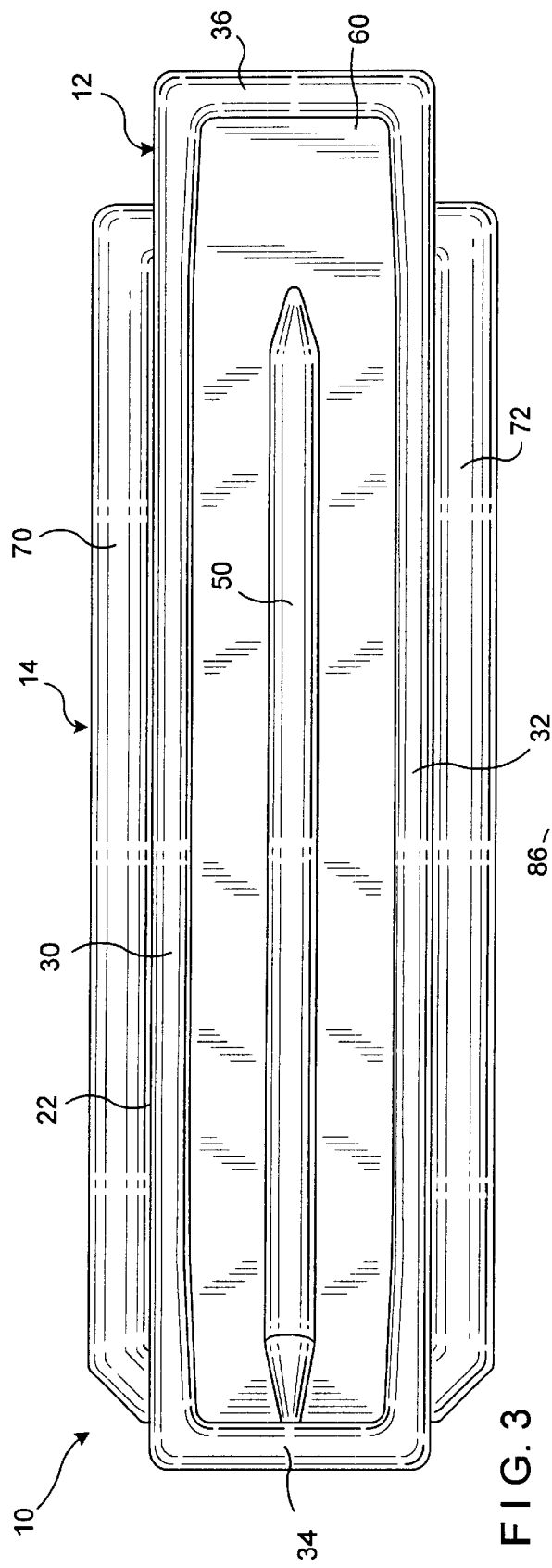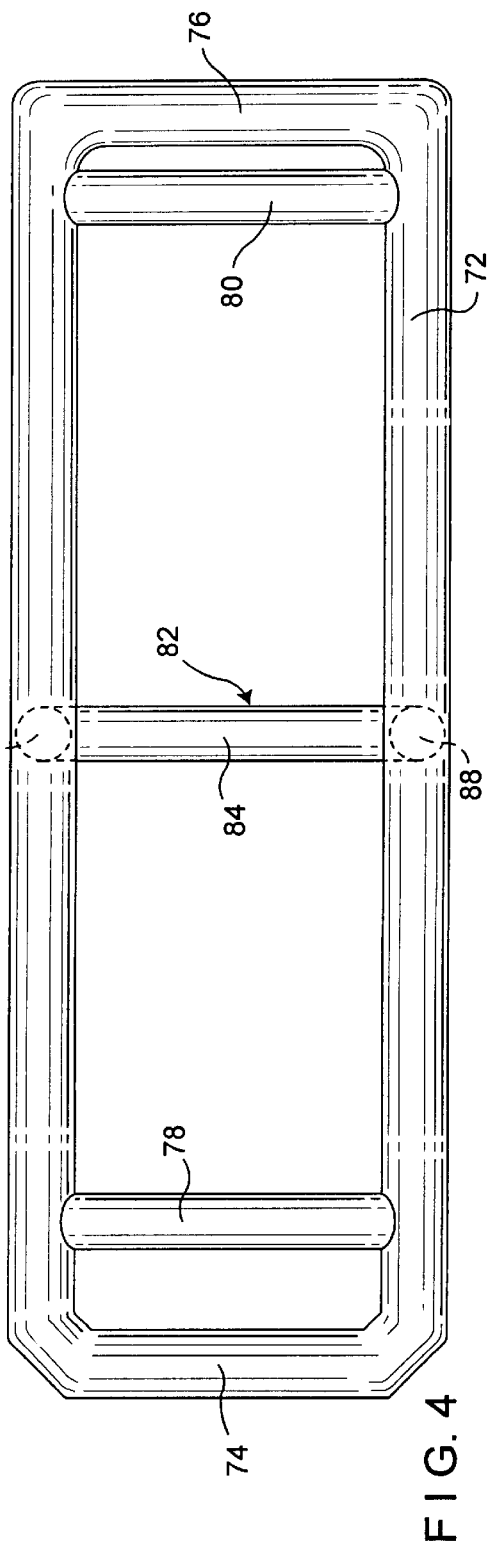

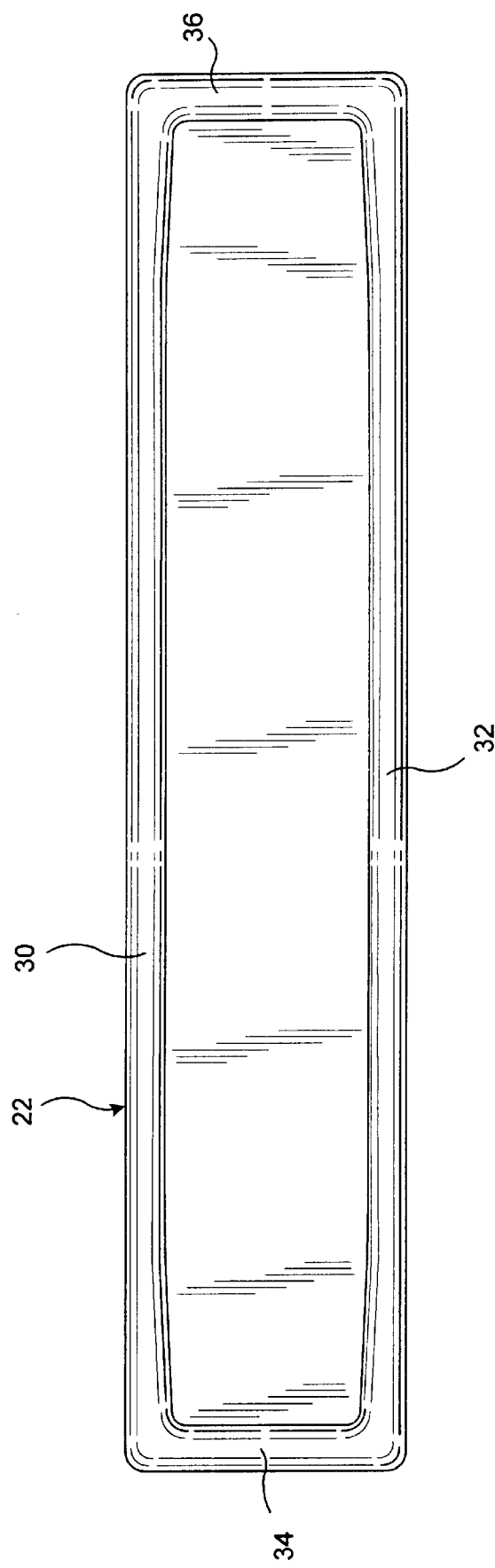
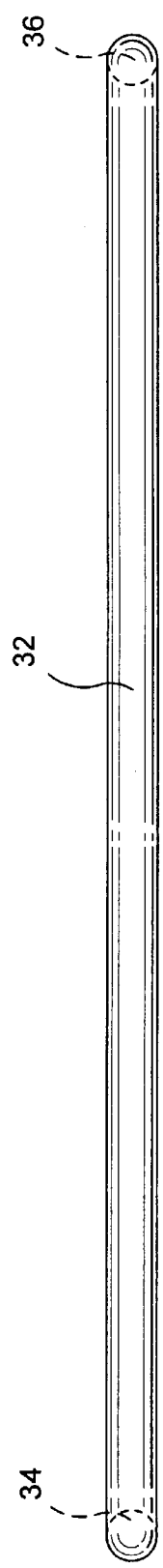
FIG. 5
FIG. 6

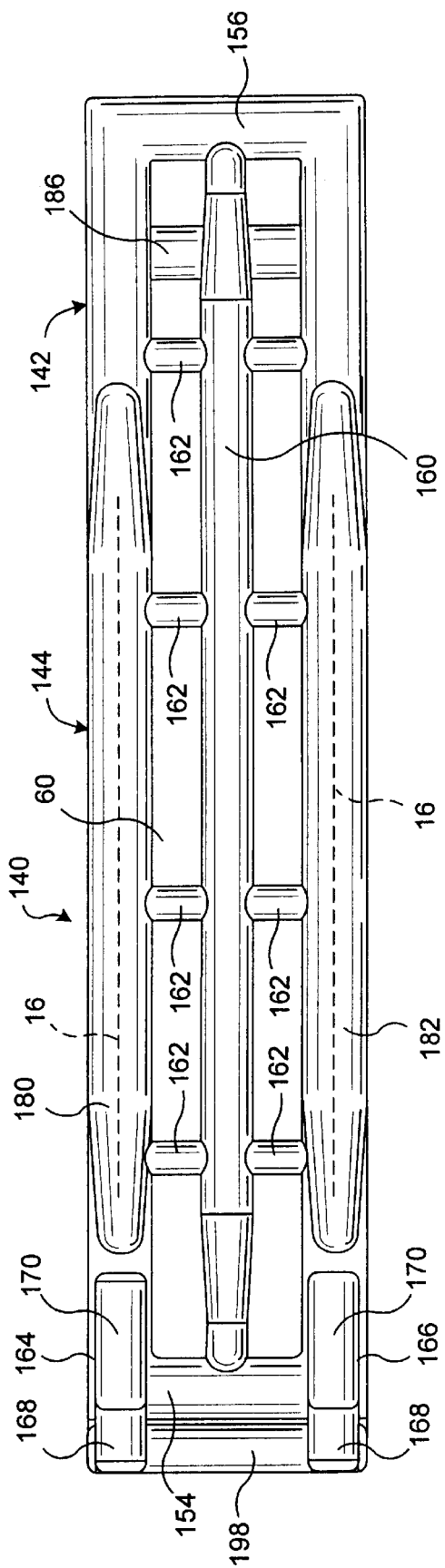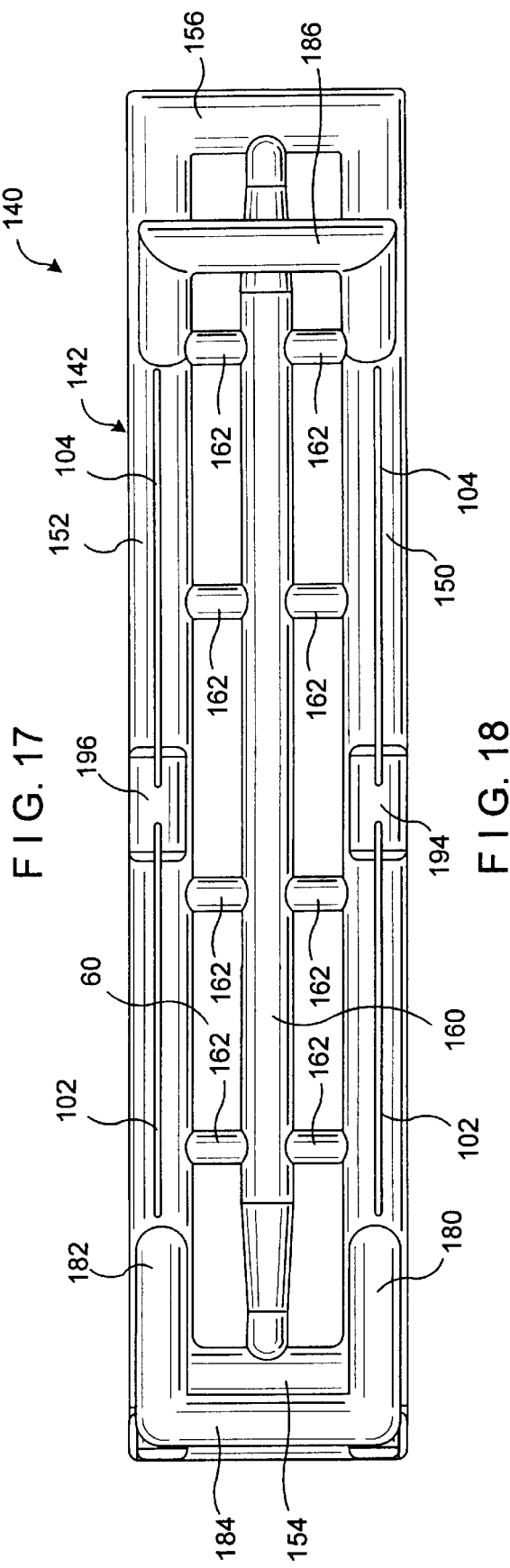
FIG. 17
FIG. 18

INFLATABLE EVACUATION SLIDE WITH ARCH SUPPORT

BACKGROUND OF THE INVENTION

1. Field of the Invention

This invention relates generally to inflatable structures, and more particularly to inflatable evacuation slides with improved support.

2. Description of the Related Art

Prior art inflatable structures are typically constructed of several pieces of material adhesively bonded together to form tubular members impervious to air and water. Such tubular members are often found in water floatation devices such as life rafts, and inflatable evacuation slides or escape chutes for commercial aircraft. The inflatable evacuation slides and/or slide rafts provide a rapid means for evacuating passengers in the event of an emergency. The slides are typically constructed with two or more inflatable support tubes and a flexible floor that extends between the support members. The slides are normally stored uninflated in a container mounted on the interior of the aircraft door or immediately adjacent thereto. With the door closed, a girt bar is connected to brackets on the floor inside the doorway such that it is only necessary to open the door to automatically deploy the slide in the event of an emergency evacuation. When the door is opened, the girt bar causes release of the slide from the container and gravity causes the slide to unfold or unroll outside the doorway. Once outside the doorway, the support tubes are rapidly inflated through the application of gas pressure and, together with the floor, create a relatively stiff sliding surface for receiving evacuating passengers.

Although the rate of evacuee descent is dependent on many factors, it is primarily governed by the angle formed between the slide surface and the ground. The optimum rate of descent for evacuees is usually achieved when the angle between the slide surface and ground is between about 30° and 50°. If the angle is much greater than 50°, the slide surface may be too steep, resulting in possible evacuee injury upon impact with the ground.

Since the slide surface has a fixed length and since the exit door may be at different heights when the aircraft comes to rest, in some instances, the ideal range of angles cannot be attained. In emergency situations where one or more of the aircraft landing gears are damaged and/or collapsed, the aircraft itself may be tilted or canted. Consequently, the aircraft door may be considerably higher with respect to the ground than when in the normal landing position. With the increase in height between the door and ground, the angle between the slide and ground also increases, leading to an undesirable rate of descent for evacuees. This phenomena can also occur for normal landing positions when the evacuation slide encounters terrain which varies in elevation.

In addition, double-decker aircraft with their ultra-high sill heights require longer escape slides to maintain the ideal angle between the slide surface and ground. Existing evacuation slides are limited by the amount of load that they are capable of carrying over a specific length. A longer length escape slide is more susceptible to undesirable bending and buckling than a shorter length escape slide when subjected to the same load. This is due to increased bending moment at the center of the longer length slide. Although the diameter of the inflatable support tubes can be increased to support greater loads, they are typically limited to approximately 24 inches. This factor in turn limits the amount of load that can be supported by the slide. The prior art, which uses substantially straight support tubes, is often not capable of producing the slide lengths necessary for the evacuation of passengers from upper decks of modern aircraft which is not deformed in use. Thus, the inflatable support tubes are typically limited in the amount of load that they can support.

In recognition of this problem, several proposals have been developed by the prior art to increase the load carrying capacity of the inflatable evacuation slides having substantial lengths. According to one such proposal, the inflatable structures have been cambered by positioning tension bands underneath the inflatable structure until the substantially straight support tubes are curved upwardly. In use, the curved support tubes tend to straighten under an applied load and are therefore capable of supporting more load at the center of the inflatable structure than the uncambered straight tubes which would normally buckle under the applied load. Although this technique is currently used throughout the industry, the formation of forced arch that can be created in the support tubes is limited, thereby limiting the length of the slide and the amount of load that can be safely supported by the slide. Thus, it has been a long felt and unsolved need to provide the inflatable evacuation devices of substantial lengths capable of transferring passengers from ultra-high sill heights without compromising reliability of the structures and safety of the evacuees.

SUMMARY OF THE INVENTION

According to the present invention, an inflatable evacuation device adapted for deployment from an exit opening of a structure comprises first and second inflatable elongate beams and a floor that extends between the beams. The floor is constructed of a flexible material, such that the inflatable evacuation device can be stored in a compact manner prior to inflation. An arch-shaped support portion comprising at least one curved beam connected to the inflatable slide portion such that forces generated at least near the central section of the inflatable slide portion are transferred to at least one curved beam to thereby support at least the central section.

Further according to the invention, an inflatable evacuation device adapted for deployment from an exit opening of a structure includes an inflatable slide portion and an arch-shaped support portion for supporting the inflatable slide portion. The inflatable slide portion has a support frame with a first inflatable elongate beam and a second inflatable elongate beam spaced from the first inflatable elongate beam. A floor extends between the first and second inflatable elongate beams and is constructed of a flexible material, such that the inflatable evacuation device can be stored in a compact manner prior to inflation. The arch-shaped support portion comprising first and second curved beams connected to the inflatable slide portion such that forces generated at least near the central section of the inflatable slide portion are transferred to the curved beams to thereby support at least the central section.

The foregoing and other features and advantages of the invention will be apparent from the following more particular description of preferred embodiments of the invention, as illustrated in the accompanying drawings.

BRIEF DESCRIPTION OF THE DRAWINGS

The preferred embodiments of the present invention will hereinafter be described in conjunction with the appended drawings, where like designations denote like elements and provided to illustrate and not to limit the invention, and wherein:

FIG. 3 is a bottom plan view of the inflatable evacuation slide embodiment of FIG. 1;

FIG. 4 is a top plan view of an arch-shaped support structure that forms part of the inflatable evacuation slide of FIG. 1;

FIG. 5 is a top plan view of an upper inflatable support frame that forms part of the inflatable evacuation slide of FIG. 1;

FIG. 6 is a side elevational view of the upper inflatable support frame structure;

FIG. 17 is a top plan view of the inflatable evacuation slide of FIG. 16;

FIG. 18 is a bottom plan view of the inflatable evacuation slide of FIG. 16.

DETAILED DESCRIPTION OF THE PREFERRED EMBODIMENTS

Figure 1:
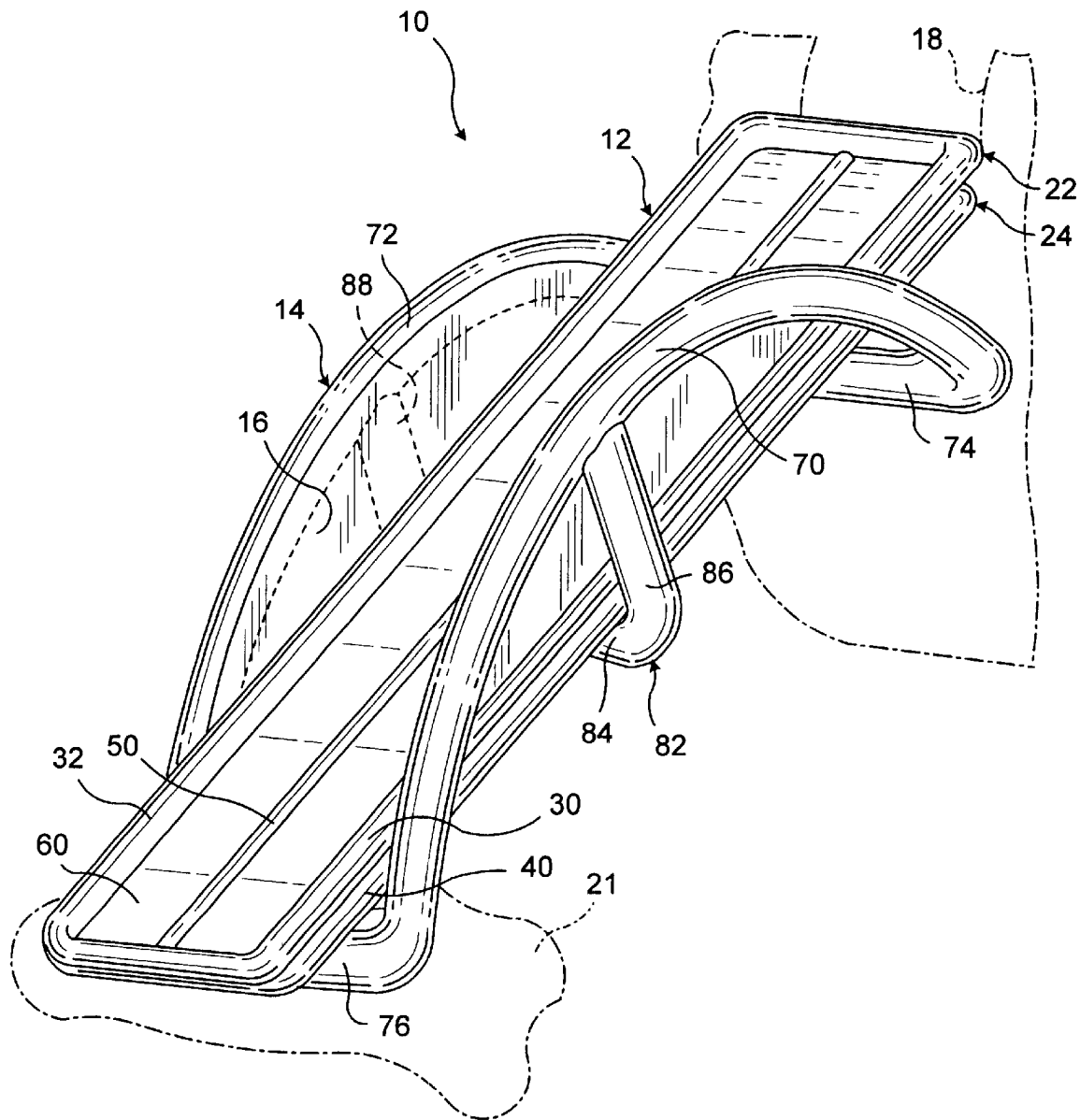
FIG. 1 is a top perspective view of an inflatable evacuation slide according to the present invention in a condition as deployed on an aircraft fuselage.

Referring now to the drawings in general, and to FIGS. 1–3 and 9 in particular, wherein an inflatable evacuation slide 10 according to the present invention is illustrated. The slide 10 comprises an inflatable slide portion 12 and an inflatable arch-shaped support portion 14 that is preferably connected to the slide portion 12. Flexible web members 16, preferably of semi-circular or crescent shape, extend between the slide portion 12 and the support portion 14 to transfer forces that may be present on the slide portion to the support portion. An upper section of the slide 10 can be connected to the doorway 18 of an aircraft fuselage 20 in a well-known manner for deployment during emergency situations, with a lower section of the slide 10 supported on the ground 21 or other surface.

In this embodiment of the invention the inflatable slide portion 12 includes an upper support frame 22 connected to or associated with a lower support frame 24. As shown in FIGS. 5 and 6, the upper support frame 22 includes longitudinally extending inflatable beams 30 and 32 that are preferably connected at their upper ends to an upper transversely extending inflatable beam 34 and at their lower ends to a lower transversely extending inflatable beam 36. Preferably, the inflatable beams 30, 32, 34 and 36 are in fluid communication with each other to form a unitary generally rectangular inflatable structure.

Figure 7:
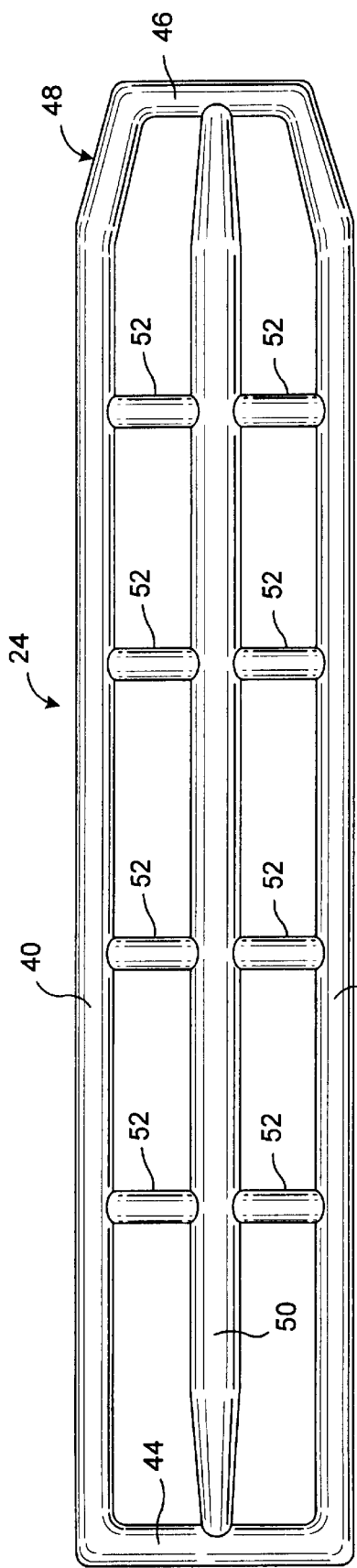
FIG. 7 is a top plan view of a lower inflatable support frame that forms part of the inflatable evacuation slide of FIG. 1.
Figure 8:
FIG. 8 is a side elevational view of the lower inflatable support frame.

As shown in FIGS. 7 and 8, the lower support frame 24 includes outer longitudinally extending inflatable beams 40 and 42 that are preferably connected at their upper ends to an upper transversely extending inflatable beam 44 and at their lower ends to a lower transversely extending inflatable beam 46. The lower beam 46 is preferably shorter in length than the upper beam 44, such that a lower end 48 of the lower support frame 24 narrows toward the lower beam 46. An inner longitudinally extending inflatable beam 50 is positioned between the outer beams 40 and 42 and extends between the upper beam 44 and the lower beam 46. A plurality of inflatable connector beams 52 extend between the outer beams 40, 42 and the inner beam 50 to provide support for the inner beam. Preferably, the inflatable beams 40, 42, 44, 46, 50, and 52 are in fluid communication with each other to form a unitary generally grid-shaped inflatable structure.

Figure 9:
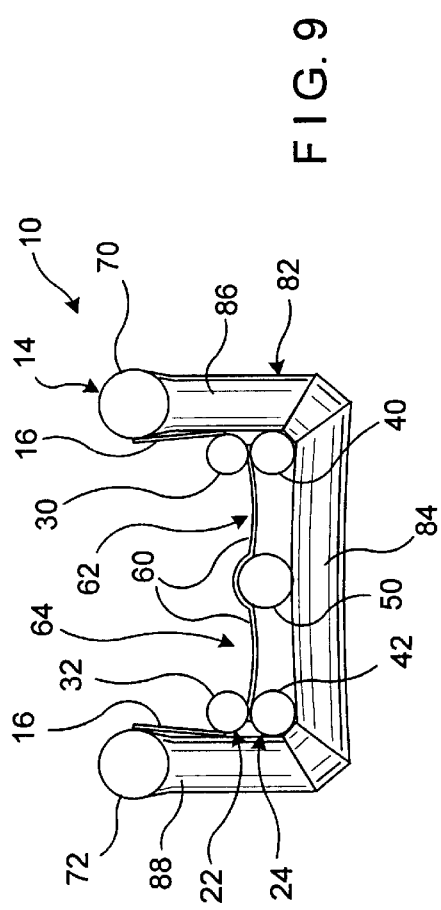
FIG. 9 is a sectional view of the inflatable evacuation slide taken along line 9—9 of FIG. 2.

As best shown in FIGS. 1 and 9, a floor or sliding surface 60 is connected to the inner beam 50 and extends on either side of the inner beam to each of the outer beams 40 and 42 of the lower support frame 24. As shown, the floor 60 is preferably sandwiched between the upper support frame 22 and the lower support frame 24. In addition to providing structural support for the floor 60, the beams 30, 32 and 50 define a pair of guide channels 62 and 64 for guiding evacuees along the floor 60 in the proper direction during evacuation from the aircraft. Supports (not shown) may be provided on the beams 30, 32 in a well-known manner for connection of a canopy (not shown) in the event that the slide 10 will be used as a life raft.

Figure 2:
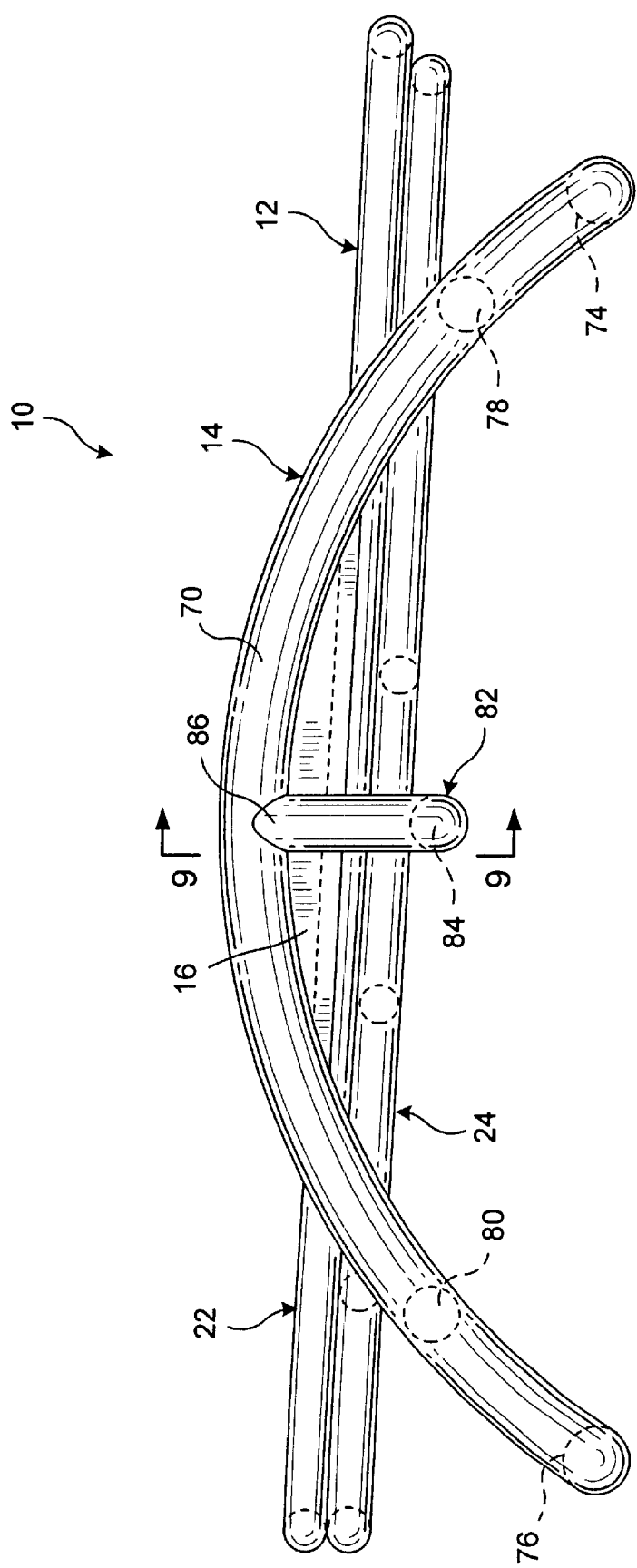
FIG. 2 is a side elevational view of the inflatable evacuation slide embodiment of FIG. 1.

With reference now to FIGS. 1, 2 and 4, the inflatable arch-shaped support portion 14 includes outer curved inflatable beams 70 and 72 that are preferably connected at their upper ends to an upper transverse inflatable beam 74 and at their lower ends to a lower transverse inflatable beam 76. The curved beams 70 and 72 are positioned at opposite longitudinal sides of the slide 12. To provide a better support for the entire inflatable evacuation slide in a deployed condition, the upper transverse beam 74 is adapted to contact the structure to which the slide 10 is attached, such as the fuselage of an aircraft. As illustrated in FIG. 1, the transverse beam 74 engages the fuselage below the doorway 18 and the inflatable slide portion 12. The lower transverse beam 76 is adapted to contact the ground or other surface near the structure. An upper inflatable cross beam 78 extends between the outer curved beams 70 and 72 proximal to and spaced from the upper transverse beam 74. Likewise, a lower cross beam 80 extends between the outer curved beams 70 and 72 proximal to and spaced from the lower transverse beam 76. The cross beams 78 and 80 contact and support upper and lower portions, respectively, of the lower support frame 24. A U-shaped cross member 82 includes a central cross beam 84 connected at its opposite ends to a pair of generally vertically extending tension beams 86 and 88. The tension beams 86 and 88 are in turn preferably connected to a central portion of the outer curved beams 70 and 72, respectively. The central cross beam 84 is adapted for contacting and supporting a middle portion of the lower support frame 24. Preferably, the curved beams 70 and 72, the upper and lower transverse beams 74 and 76, the upper and lower cross beams 78 and 80, and the U-shaped cross member 82, including the central cross beam 84 and the tension beams 86 and 88, are all in fluid communication with each other, so as to form the unitary inflatable arch-shaped support portion 14.

As best shown in FIGS. 1 and 9, the flexible web members 16 extend between and are attached to the curved beams 70, 72 and the longitudinally extending beams 30 and 32 of the upper support frame 22. The flexible web members 16 together with the U-shaped cross member 82 including the cross beam 84 and the tension beams 86, 88 transfer the bending moment forces that may be present on the inflatable slide portion 12 to the inflatable arch-shaped support portion 14. In this manner, inflatable slides can be constructed with lengths that far exceed the length of prior art inflatable slides.

The beams of the slide portion 12 and arch-shaped support portion 14 are preferably constructed of a material that is strong, flexible, light weight, puncture-resistant, abrasion-resistant, and impervious to fluid such as air and water. A woven nylon material coated with polyurethane or other elastomeric material is preferred. The polyurethane coating enhances air and water tightness of the slide 10 when inflated. It will be understood that other materials and/or coatings can be used for manufacturing of the slide 10. The floor or sliding surface 60 may be constructed of the same material as the beams, although it does not have to be impervious to fluids.

In operation, the slide 10 is preferably in a deflated or flat condition prior to use. This is necessary in order to minimize the required storage space prior to deployment. During evacuation situations where the slide 10 is deployed, the arch-shaped support portion 14, the upper support frame 22, and the lower support frame 24 are preferably automatically and simultaneously inflated to a predetermined pressure. In this embodiment, the arch-shaped support portion 14, the upper support frame 22, and the lower support frame 24 can be separately and independently inflatable through separate outlets or sources of compressed gas. In this manner, a breach in one of the structures will not cause failure of the other structures. Alternatively, valves (not shown) or other means may be provided for manually or automatically selectively directing air or other gas under pressure to the separate structures 14, 22 and 24 from a single source. The slide 10 can be used not only as an escape slide, but also as a life raft since the independently inflatable structures assure high reliability. The amount of pressure applied to each of the structures 14, 22 and 24 may be preset, selectable by an attendant or automatically set depending on the sill height of the aircraft door during various landing conditions.

As evacuees descend down the inflated slide 10, maximum bending moment forces will be present at a central section of the slide portion 12. These forces are transferred to the curved beams 70 and 72 of the arch-shaped support portion 14 through the flexible web members 16. These forces are also transferred to the arch-shaped support by means of the tension beams 86 and 88, since the central cross beam 84 supports the central section of the slide portion 12. In this manner, the tension forces incident on the web members 16 and tension beams 86 and 88 place the curved beams 70 and 72 into a state of compression. The shape of the downwardly facing arcs of the curved beams 70 and 72 enable the beams to absorb greater forces than straight beams before buckling. The flexible web members 16 also reduce isolated buckling effects. This is because the web members are efficiently connected and the forces are more evenly distributed along the length of the curved beams 70 and 72.

The slide portion 12 is further supported by the upper cross beam 78 and the lower cross beam 80. In all, the slide portion 12 is supported at five separate locations along its length through attachment at the girt bar in the fuselage 20, the upper cross beam 78, the central cross beam 84, the lower cross beam 80, and the ground 21 or other surface. With this construction, the forces acting upon the long slide portion 12 are distributed to and received by the supporting structures. Therefore the slide portion 12 is much less susceptible to bending or collapsing than prior art slides of equal length. Preferably, the slide portion 12 is connected to the arch-shaped support portion at their cross-over points. Thus, by means of the web members 16 the slide portion 12 is continuously connected to each of the curved beams 70 and 72 and is connected at three additional locations to the upper, central and lower cross beams.

Besides offering improved support of the slide portion 12, it has been found that the arch-shaped support portion 14 can continue to resist compressive loads well past a first wrinkling stage caused be reduced fluid pressure in the support portion 14 before total collapse occurs.

Moreover, it has been found that wind loads will typically produce a large suction pressure over the top regions of the curved beams 70 and 72. Consequently, additional tension stresses are incident in the fabric, thereby offsetting the onset of wrinkling by a small amount.

Figure 10:
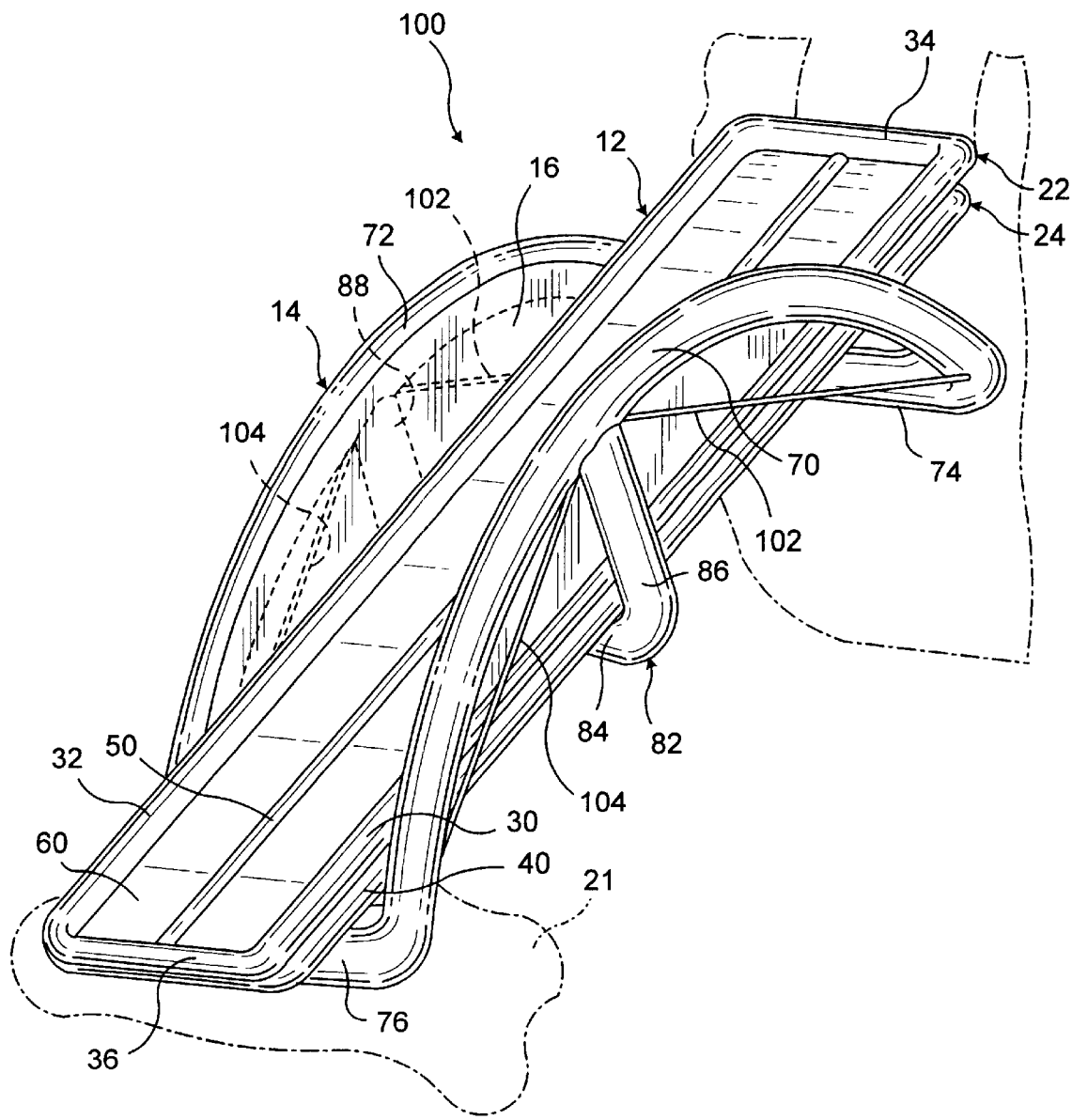
FIG. 10 is a top perspective view of an inflatable evacuation slide according to a further embodiment of the invention.
Figure 11:
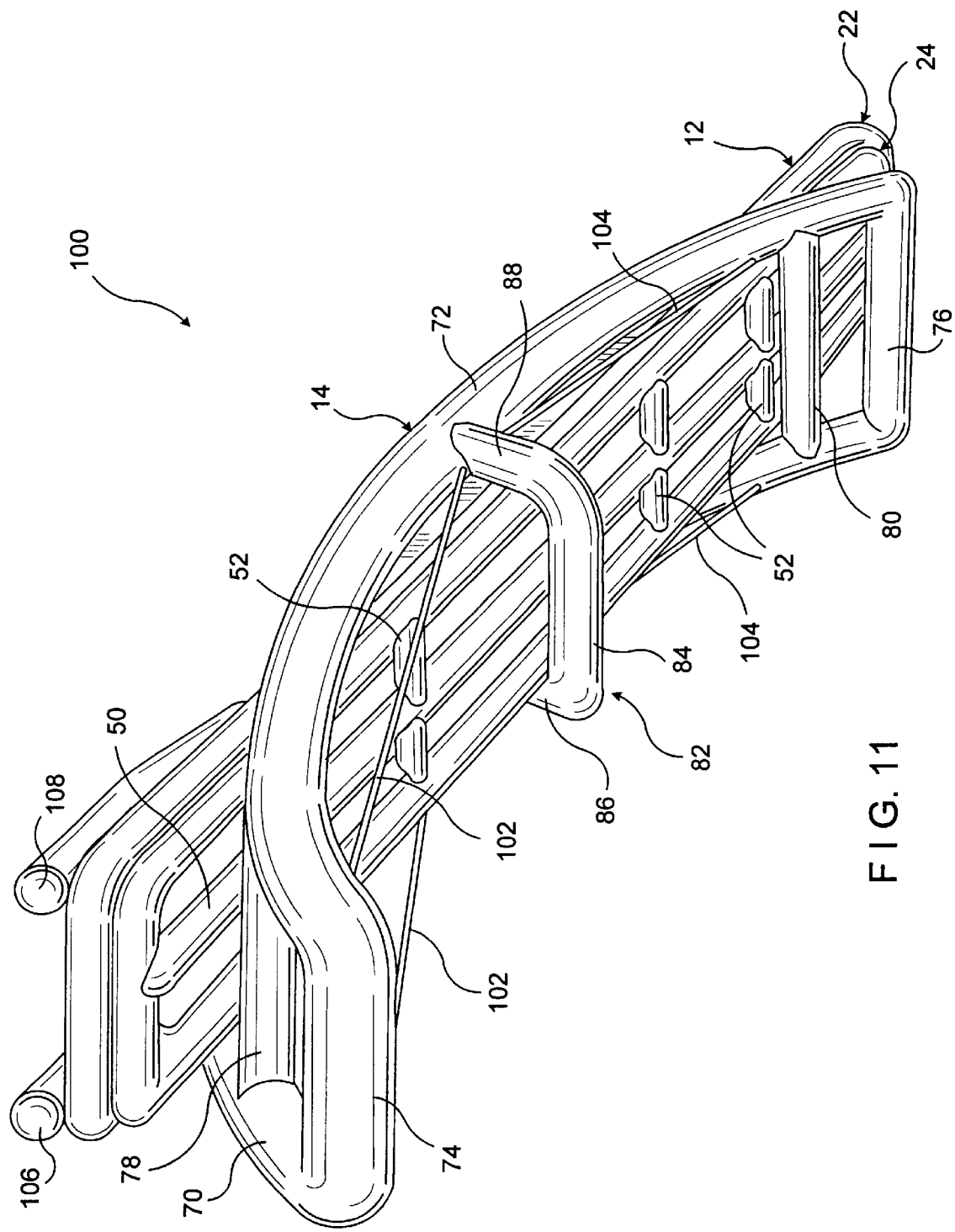
FIG. 11 is a bottom perspective view of the inflatable evacuation slide according to another embodiment of the invention.
Figure 12:
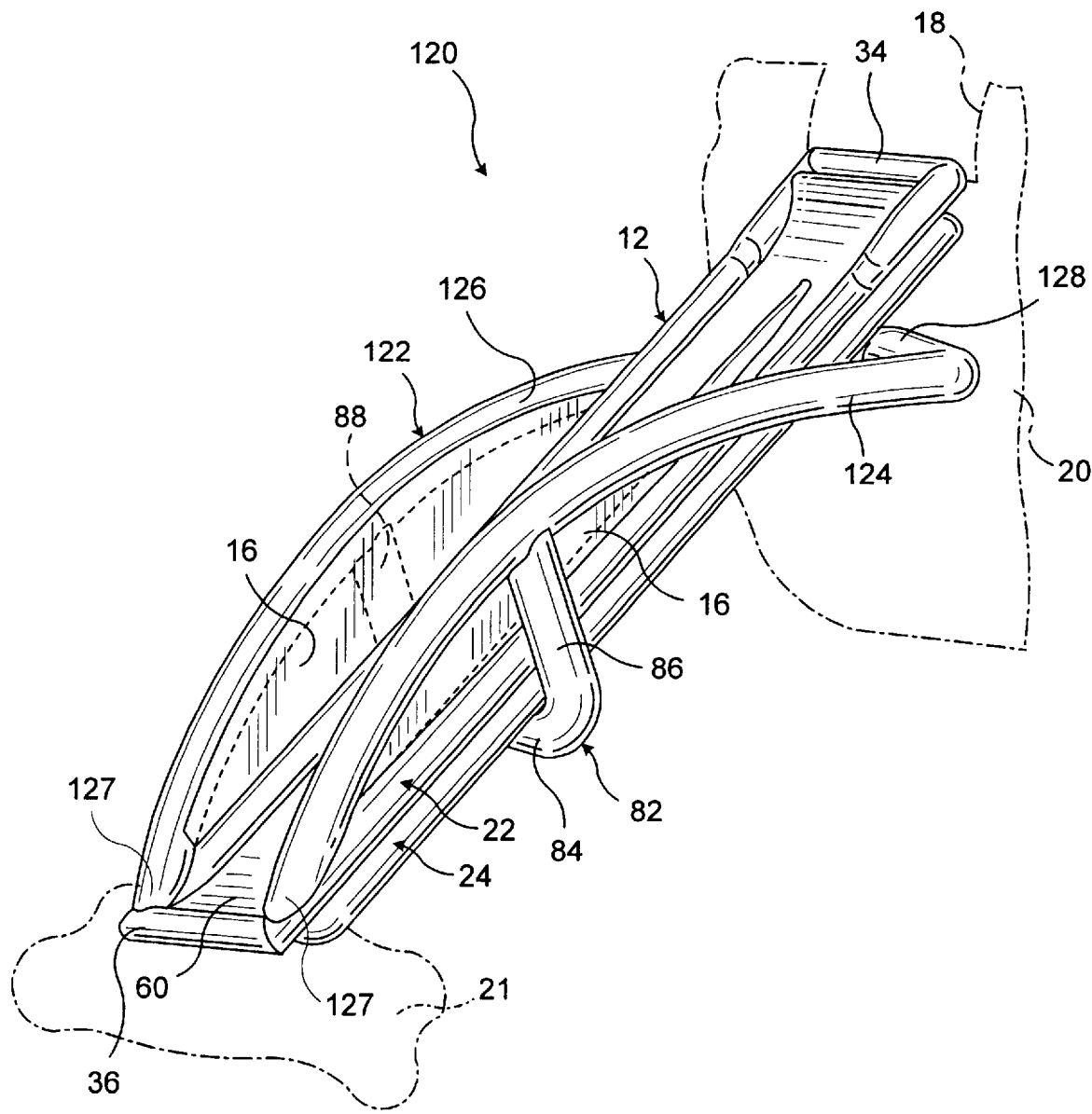
FIG. 12 is a top perspective view of an inflatable evacuation slide according to an even further embodiment of the invention.
Figure 13:
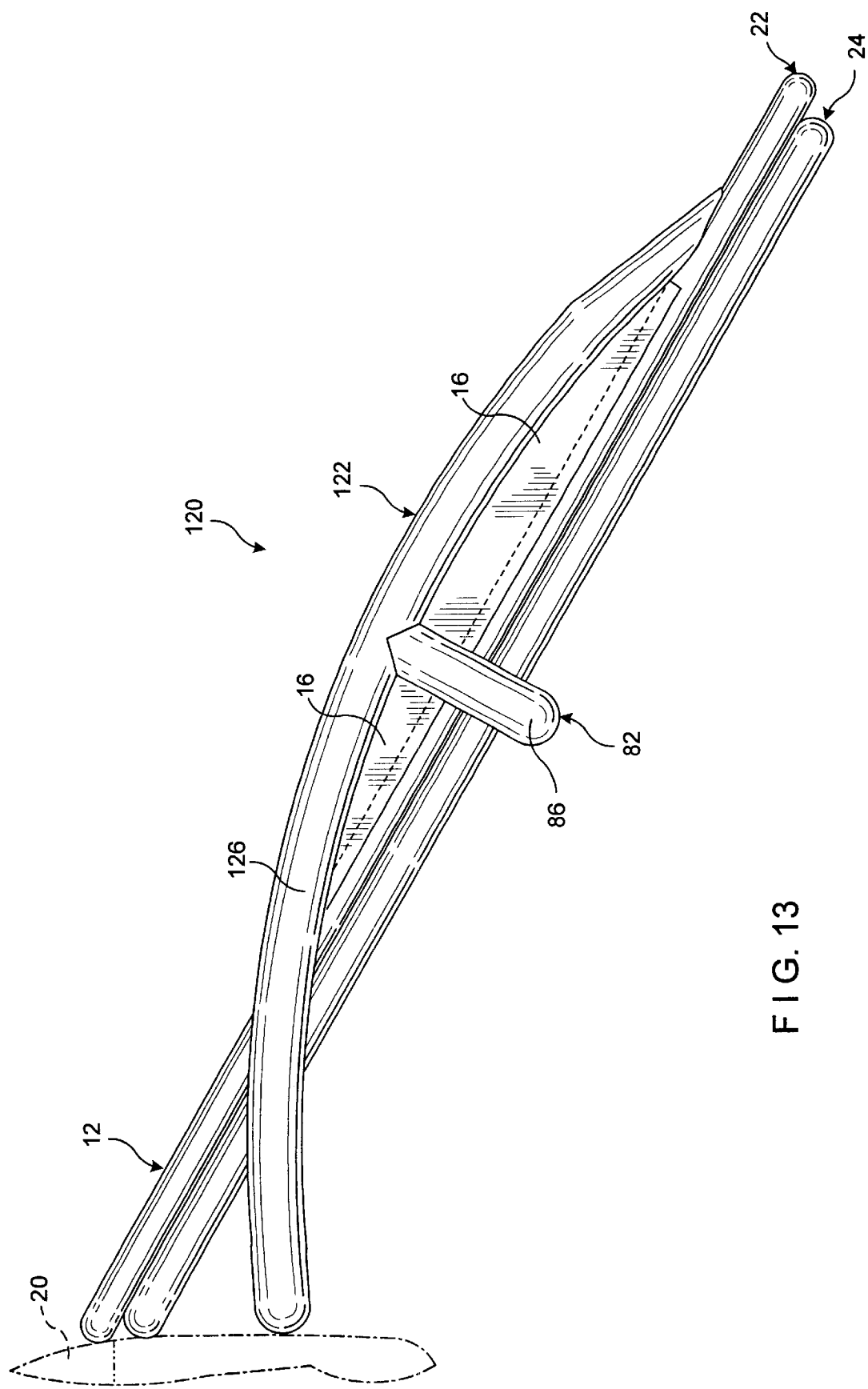
FIG. 13 is a side elevational view of the inflatable evacuation slide of FIG. 12.
Figure 14:
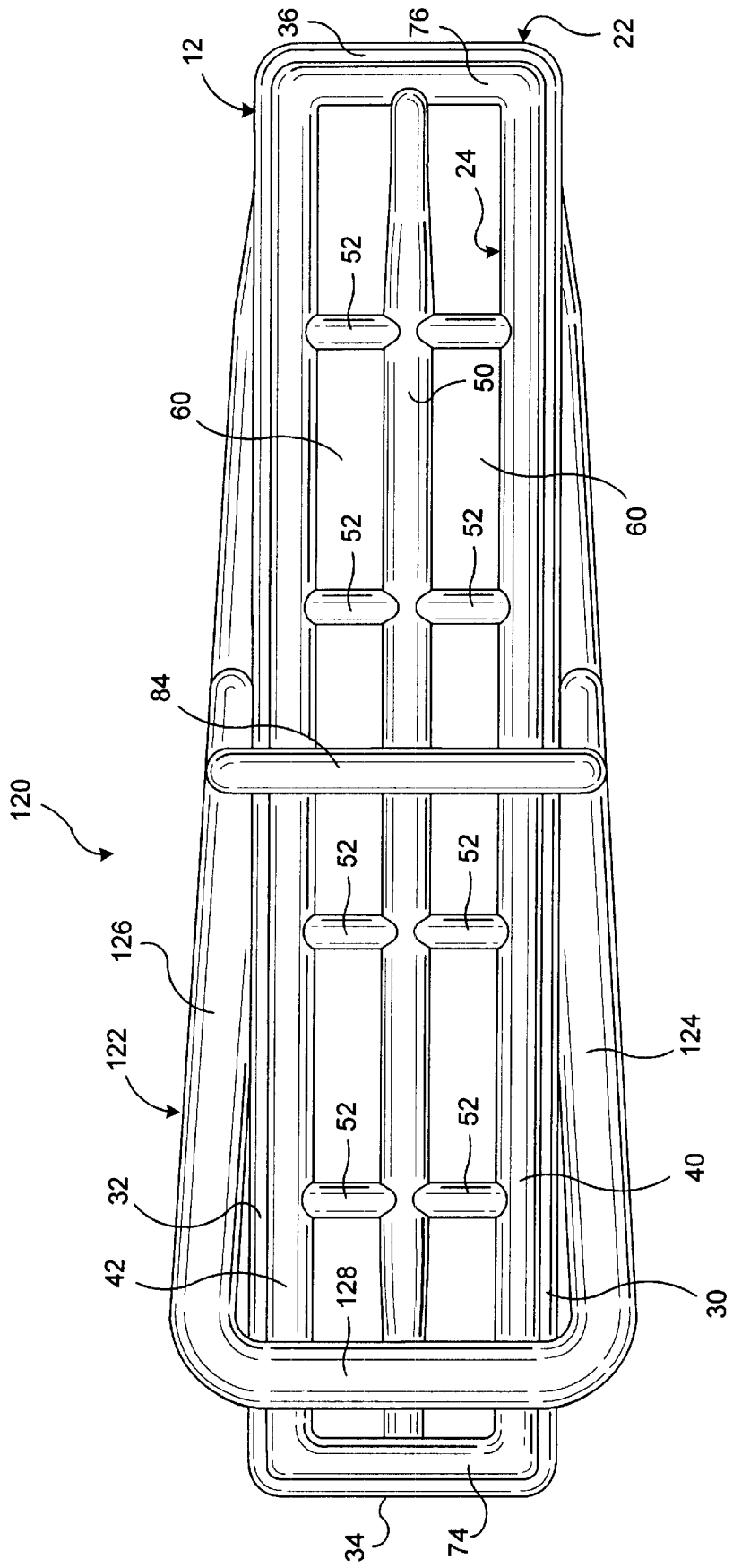
FIG. 14 is a bottom plan view of the inflatable evacuation slide of FIG. 12.
Figure 15:
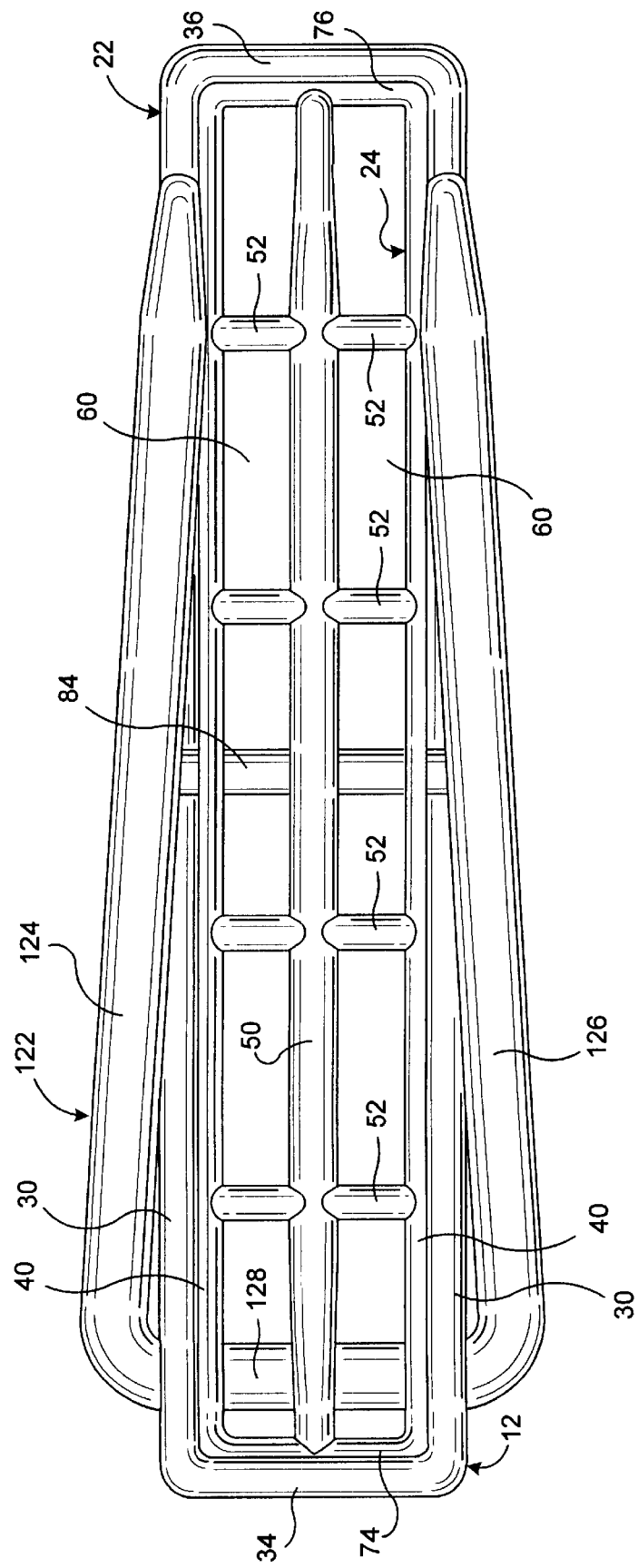
FIG. 15 is a top plan view of the inflatable evacuation slide of FIG. 12.
Figure 16:
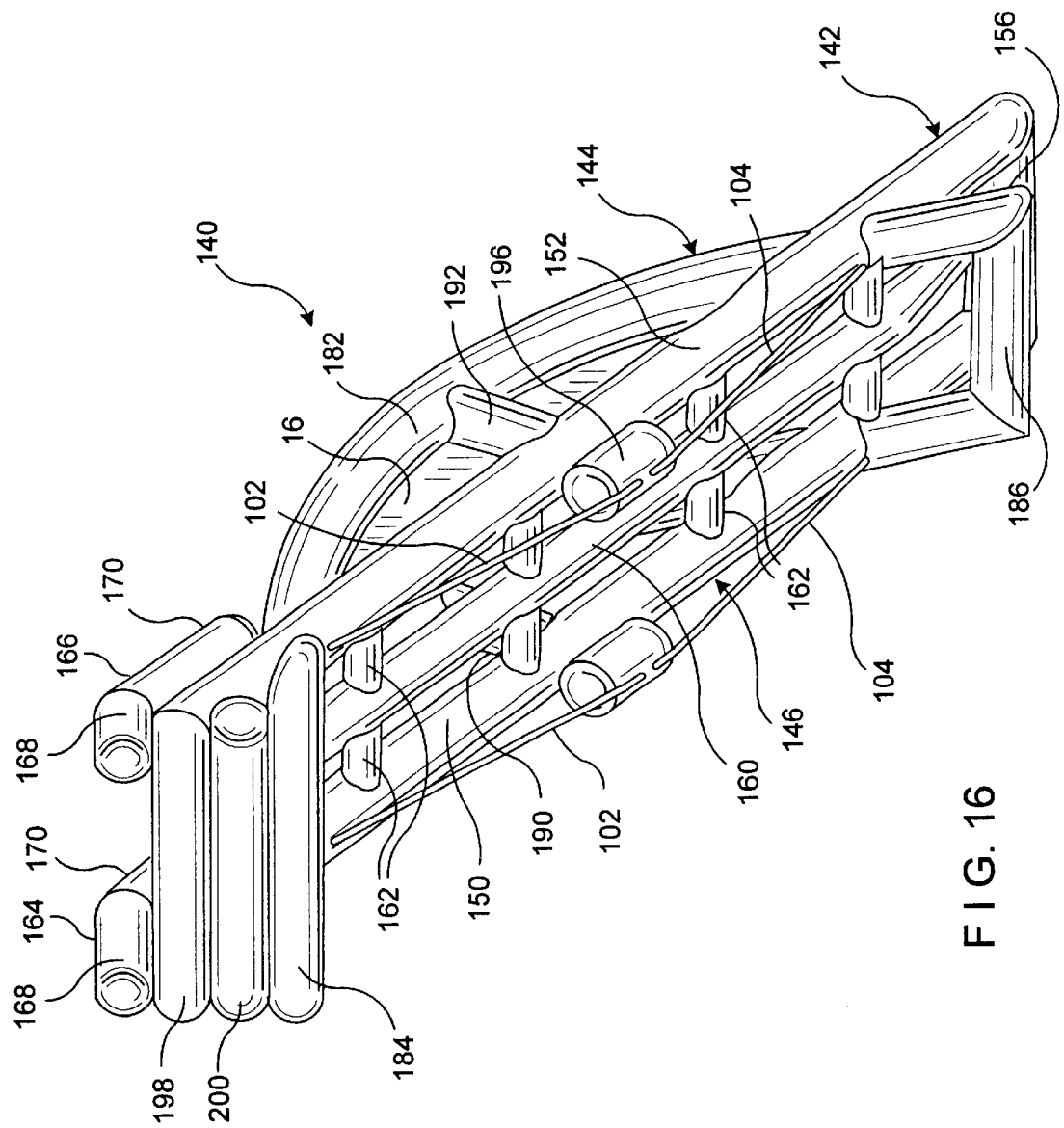
FIG. 16 is a bottom perspective view of an inflatable evacuation slide according to an even further embodiment of the invention.
Figure 19:
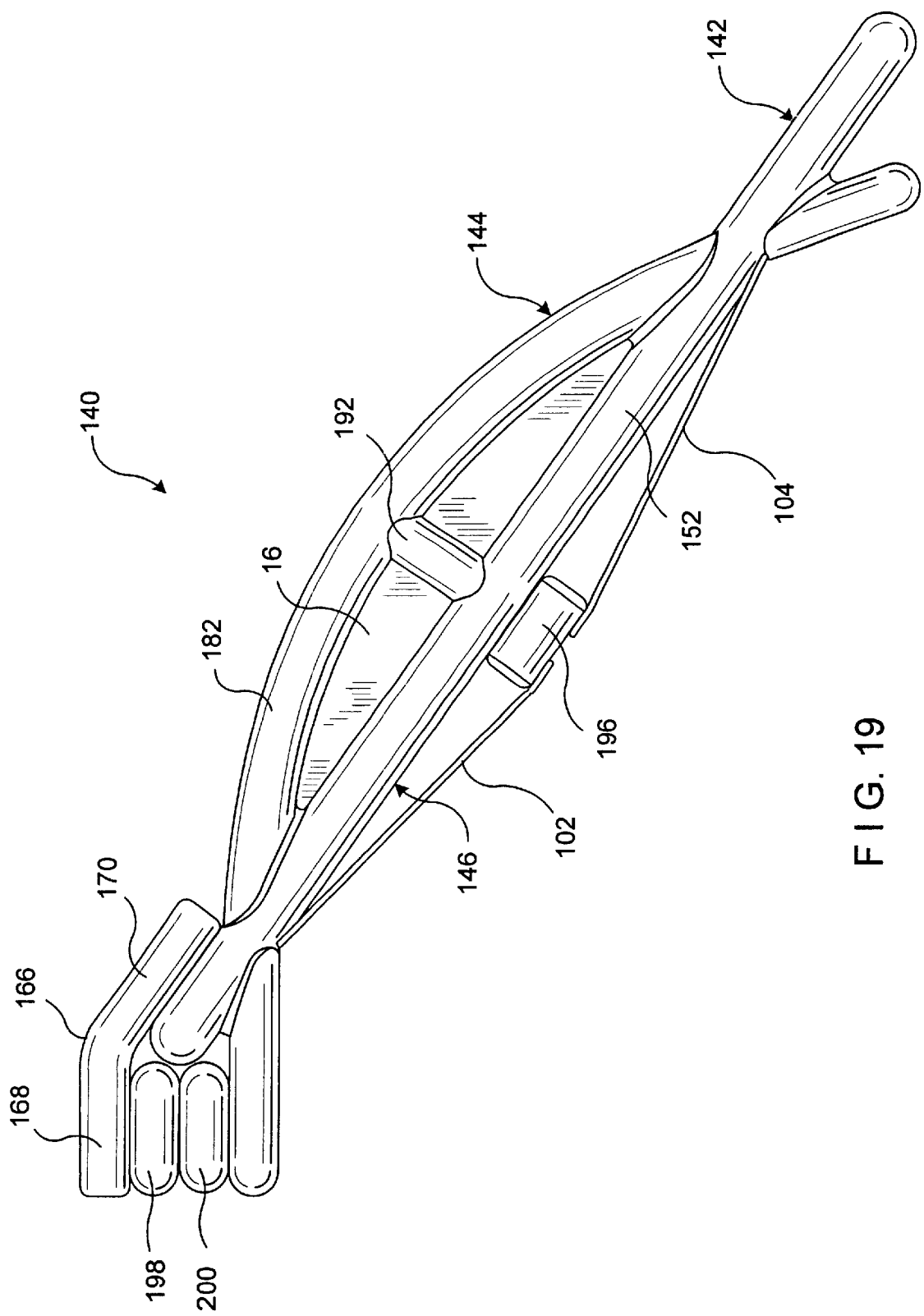
FIG. 19 is a side elevational view of the inflatable evacuation slide of FIG. 16.

With reference now to FIGS. 10 and 11, an inflatable evacuation slide 100 according to a further embodiment of the invention is illustrated, wherein like parts in the previous embodiment are represented by like numerals. The slide 100 is similar in construction to the slide 10 previously described, with the exception that upper tension cords 102 extend between the upper portion of the curved beams 70, 72 proximal the upper transverse beam 74 and the central portion of the outer curved beams proximal the tension beams 86 and 88, respectively. Likewise, lower tension cords 104 extend between the lower end of the curved beams 70, 72 proximal the lower transverse beam 76 and the central portion of the outer curved beams proximal the tension beams 86 and 88, respectively. The tension cords 102, 104 reinforce the curved beams 70, 72 and help to further prevent their buckling when the slide 10 is subject to heavy loads or when the curved beams are under-inflated.

As shown in FIG. 11, upper inflatable guide beams 106, 108 can also be provided at an upper end of the slide 100 adjacent the upper frame 22 for guiding passengers, luggage or other items when exiting the aircraft.

With reference now to FIGS. 12–15, a slide 120 according to a further embodiment of the invention is illustrated, wherein like parts in the previous embodiments are represented by like numerals. The slide 120 includes the inflatable slide portion 12 with the upper and lower support frames 22 and 24, respectively, and an inflatable arch-shaped support portion 122 connected to the slide portion 12.

The arch-shaped support portion 122 includes outer curved inflatable beams 124 and 126 that are preferably connected at their upper ends to an upper transverse inflatable beam 128 and at their lower ends to a lower portion of the upper frame 22 adjacent the transversely extending inflatable beam 36. As in the previous embodiments, the curved beams 124 and 126 are positioned at opposite longitudinal sides of the slide 12. In a deployed condition, the upper transverse beam 128 is adapted to contact the structure to which the slide 10 is attached, such as the fuselage 20 of an aircraft. A U-shaped cross member 82 includes a central cross beam 84 connected at its opposite ends to a pair of generally vertically extending tension beams 86 and 88. The tension beams 86 and 88 are in turn preferably connected to a central portion of the outer curved beams 124 and 126, respectively. The central cross beam 84 contacts and supports a middle portion of the lower support frame 24. Preferably, the curved beams 124 and 126, the upper transverse beam 128, and the U-shaped cross member 82, including the central cross beam 84 and the tension beams 86 and 88, are all in fluid communication with each other to form the inflatable arch-shaped support. The lower end 127 of each curved beam can be in fluid communication with the upper support frame 22, so that inflation of the of the arch-shaped support 122 occurs with inflation of the upper support frame. Alternatively, the arch-shaped support frame 122 can be separately inflatable, as in the previous embodiments. With the separately inflatable structures, the slide 120 can also function as a raft when disconnected from the fuselage.

The slide 120 constructed in the above-described manner is relatively wide at its upper end adjacent the fuselage 20 to thereby provide highly desirable additional support. The slide 120 is narrow at its lower end adjacent the ground. This is because the lower end of the arch-shaped support is generally in alignment with the lower end of the upper support frame 22, (see, for example, FIG. 15). Since as many as eight or nine slides may extend from one side of an aircraft, there may be a crowding of the slides relative to each other during deployment. Thus, the narrow lower end of the inflatable structure reduces the likelihood of interference between inflatable structures during deployment.

With reference now to FIGS. 16–19, an inflatable evacuation slide 140 according to a further embodiment of the invention is illustrated, wherein like parts in the previous embodiments are represented by like numerals. The evacuation slide 140 of this embodiment is simpler and lighter than some of the above-described evacuation slides of equal length. In this respect, the upper and lower support frames are replaced by a single support frame 146 and T-shaped tension arrangements are provided instead of the U-shaped cross member. The slide 140 comprises an inflatable slide portion 142 and an inflatable arch-shaped support portion 144 that can be fluidly connected to the slide portion 142. Thus, in this embodiment of the invention the inflatable slide portion 142, and the inflatable arc-shaped support portion 144 form an interconnected unitary structure. Flexible web members 16 extend between the slide portion 142 and the support portion 144 to transfer forces that may be present on the slide portion to the support portion, as previously described.

The inflatable slide portion 142 has a single support frame 146 that is similar in construction to the lower support frame 24 previously described, with outer longitudinally extending inflatable beams 150 and 152 that are preferably connected at their upper ends to an upper transversely extending inflatable beam 154 and at their lower ends to a lower transversely extending inflatable beam 156. An inner longitudinally extending inflatable beam 160 is positioned between the outer beams 150 and 152 and extends between the upper tubular beam 154 and the lower tubular beam 156. A plurality of inflatable connector beams 162 extend between the outer beams 150, 152 and the inner beam 160 to provide support for the inner beam. Upper inflatable guide beams 164, 166 are provided at an upper end of the slide 140 adjacent the support frame 146 for guiding passengers when exiting the aircraft or other structure. Each of the guide beams 164 and 166 includes a generally horizontal portion 168 and an angled portion 170 that is connected to an upper surface of the longitudinally extending inflatable beams 150 and 152, respectively. A floor 60 is preferably connected to an upper surface of the support frame 146 between the inner beam 160 and the outer beams 150 and 152 for receiving and supporting passengers when exiting the aircraft or other structure.

The arch-shaped support portion 144 includes outer curved inflatable beams 180 and 182 that are preferably connected at their upper ends to an upper transverse inflatable beam 184 and at their lower ends to a lower transverse inflatable beam 186. The curved beams 180 and 182 extend through upper and lower portions of the longitudinally extending beams 150 and 152, respectively. In a deployed condition, the upper transverse beam 184 is adapted to contact the structure to which the slide 10 is attached, such as the fuselage of an aircraft, while the lower transverse beam 186 is adapted to contact the ground or other surface near the structure. One inflatable tension arrangement includes an inflatable tension beam 190 which extends from a central portion of the curved beam 180 and through a middle portion of the longitudinally extending beam 150. Likewise, another inflatable tension arrangement includes an inflatable tension beam 192 extending from a central portion of the curved beam 182 and through a middle portion of the longitudinally extending beam 152. An inflatable support 194 is connected to a lower end of the tension beam 190 and an inflatable support 196 is provided at a lower end of the tension beam 192. Thus, in this embodiment of the invention each inflatable tension beam and the respective inflatable support form the T-shaped tension arrangement.

Inflatable transverse sill beams 198 and 200 are positioned at the upper end of the support frame 142 between the guide beams 164, 166 and the upper transverse beam 184.

Preferably, the inflatable slide portion 142 and the inflatable arch-shaped support portion 144 are fluidly connected together to form an inflatable slide that can be deployed in a quick and efficient manner from a single source of pressurized fluid. It will be understood that two or more sources of pressurized fluid can be connected to the inflatable evacuation slide for back-up or for quicker deployment of the slide 140. Where the arch-shaped support portion 144 intersects the slide portion 142, the intersecting edges or seams as well as other seams are sealed to prevent fluid leakage when the inflatable slide 140 is pressurized.

In use, as evacuees descend down the inflated slide 140, maximum bending moment forces will be present near the central section of the slide portion 142. These forces are transferred to the curved beams 180 and 182 of the arch-shaped support portion 144 through the flexible web members 16, as well as the tension beams 190 and 192. The supports 194 and 196 at the lower ends of the tension beams 190 and 192, respectively, help to lift and support the central section of the slide portion 142. In this manner, the tension forces incident on the web members 16 and tension beams 190 and 192 put the curved beams 180 and 182 into compression. The shape of the downwardly facing arcs of the curved beams 180 and 182 enable the beams to absorb greater forces than straight beams before buckling. The flexible web members 16 also reduce buckling effects since forces are distributed along the substantial length of the curved beams. The upper end of the slide portion 142 is also well supported by the sill blocks 198 and 200 which are compressed between the upper ends of the curved beams 180 and 182 and the guide beams 164 and 166. The tension bands 102 and 104 are preferably provided between the inflatable supports 194 and 196 and the respective ends of the curved beams 180 and 182 in a manner described with reference to the embodiment of FIG. 10 for strengthening the slide 140 even further.

The inflatable escape slide 140 is relatively narrow in construction and thus minimizes the amount of material and fluid to pressurize the slide when compared to the previous embodiments. The escape slide 140 can be more easily and quickly deployed than the previous embodiments, since the inflatable components are all fluidly interconnected. Due to the relatively narrow configuration of the slide 140, multiple inflatable slides can deployed from the same side of an aircraft with minimal risk of interference between adjacent slides.

It will be understood that the terms upper, lower, vertical, center and any other terms of orientation and/or position, including their derivatives as may be used throughout the specification, refer to relative rather than absolute orientations and/or positions.

While the invention has been taught with specific reference to the above-described embodiments, those skilled in the art will recognize that changes can be made in form and detail without departing from the spirit and the scope of the invention. By way of example, although the evacuation slide is intended primarily for use with aircraft, it is to be understood that the evacuation slide may be used in other environments where escape from an exit opening associated with other structures or vehicles, such as a house, building or boat, is necessary for personal safety. Thus, the described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. An inflatable evacuation device adapted for deployment from an exit opening of a structure, the inflatable evacuation device comprising:
    an inflatable slide portion, comprising:
        at least a first inflatable elongate beam; and
        a second inflatable elongate beam spaced from the first inflatable elongate beam;
        a floor extending between the at least first and second inflatable elongate beams, the floor being constructed of a flexible material; and
    an inflatable arch-shaped support portion comprising at least one substantially vertically oriented inflatable curved beam connected to the inflatable slide portion, such that forces generated at least at a central section of the inflatable slide portion are transferred to the at least one substantially vertically oriented curved beam to thereby support at least the central section.

2. An inflatable evacuation device according to claim 1, and further comprising an inflatable tension beam extending between the inflatable slide portion and the at least one inflatable curved beam for transferring forces from the inflatable slide portion to the at least one inflatable curved beam.

3. An inflatable evacuation device according to claim 2, wherein the inflatable tension beam extends between a central portion of the at least one inflatable curved beam and the central section of the inflatable slide portion.

4. An inflatable evacuation device according to claim 3, and further comprising a flexible web portion extending between the at least one curved beam and the at least one of elongate beams for transferring the forces from the inflatable slide portion to the at least one curved beam.

5. An inflatable evacuation device according to claim 4, wherein the flexible web portion extends between a central region of the at least one curved beam and a central region of the at least one of the elongated beams.

6. An inflatable evacuation device according to claim 1, wherein the at least one curved beam is located outside of the inflatable slide portion.

7. An inflatable evacuation device according to claim 6, wherein a lower end of the at least one curved beam is in fluid communication with at least one of the elongate beams.

8. An inflatable evacuation device according to claim 1, wherein the at least one curved beam extends through at least one of the elongate beams.

9. An inflatable evacuation device according to claim 8, wherein the at least one curved beam is in fluid communication with the at least one elongate beam.

10. An inflatable evacuation device adapted for deployment from an exit opening of a structure, the inflatable evacuation device comprising:
    an inflatable slide portion comprising:
        an inflatable support frame having a first inflatable elongate beam and a second inflatable elongate beam spaced from the first inflatable elongate beam, and
        a floor extending between the first and second inflatable elongate beams, the floor being constructed of a flexible material; and
    an inflatable arch-shaped support portion comprising first and second substantially vertically oriented inflatable curved beams connected to the inflatable slide portion, such that forces generated at least at a central section of the inflatable slide portion are transferred to the substantially vertically oriented inflatable curved beams to thereby support at least the central section.

11. An inflatable evacuation device according to claim 10, wherein the first and second inflatable curved beams are connected to the first and second inflatable elongate beams, respectively.

12. An inflatable evacuation device according to claim 10, wherein the inflatable arch-shaped support portion further comprises an inflatable upper transverse beam extending between upper ends of the first and second curved beams and a lower inflatable transverse beam extending between lower ends of the first and second curved beams.

13. An inflatable evacuation device according to claim 12, wherein the inflatable arch-shaped support portion further comprises an inflatable U-shaped cross member including an inflatable central cross beam for supporting the slide portion and first and second inflatable tension beams extending between the central cross beam and central portions of the first and second curved beams, respectively, to thereby transfer forces from the slide portion to the curved beams.

14. An inflatable evacuation device according to claim 13, and further comprising a first web portion extending between the first curved beam and the first elongate beam, and a second web portion extending between the second curved beam and the second elongate beam for transferring forces from the inflatable slide portion to the curved beams.

15. An inflatable evacuation device according to claim 14, wherein the first web portion extends between a central region of the first curved beam and a central region of the first elongate beam; and the second web portion extends between a central region of the second curved beam and a central region of the second elongate beam.

16. An inflatable evacuation device according to claim 13, wherein the central cross beam, the upper cross beam and lower cross beam support the slide portion.

17. An inflatable evacuation device according to claim 14, wherein the curved beams are located outside of the elongate beans.

18. An inflatable evacuation device according to claim 10, wherein lower ends of the first and second curved beams are in fluid communication with lower ends of the first and second elongate beams, respectively.

19. An inflatable evacuation device according to claim 10, wherein the first and second curved beams extend through the first and second elongate beams, respectively.

20. An inflatable evacuation device according to claim 19, wherein the first and second elongate beams are in fluid communication with the first and second curved beams, respectively.

21. An inflatable evacuation device according to claim 19, wherein the inflatable arch-shaped support portion further comprises a first inflatable tension beam extending between a central section of the first curved beam and a central section of the first elongate beam, and a second inflatable tension beam extending between a central section of the second curved beam and a central section of the second elongate beam, to thereby transfer forces from the slide portion to the arch-shaped support portion.

22. An inflatable evacuation device according to claim 21, wherein the first and second elongate beams are in fluid communication with the first and second curved beams and the first and second tension beams.

23. An inflatable evacuation device according to claim 21, wherein the arch-shaped support portion further comprises an upper inflatable transverse beam extending between the upper ends of the first and second curved beams.

24. An inflatable evacuation device according to claim 23, wherein the inflatable arch-shaped support portion further comprises a lower inflatable transverse beam extending between the lower ends of the first and second curved beams.

25. An inflatable evacuation device according to claim 24, wherein the upper and lower inflatable transverse beams are positioned under the inflatable slide portion.

26. An inflatable evacuation device according to claim 10, and further comprising tension cords extending between a central section of at least one of an upper and lower section of each curved beam to thereby strengthen the curved beams.

27. An inflatable evacuation device adapted for deployment from an exit opening of a structure, the inflatable evacuation device comprising:
    an inflatable slide portion including at least first and second inflatable elongated beams spaced from each other;
    a floor extending between said at least first and second inflatable elongated beams; and
    an inflatable arch-shaped support portion comprising first and second inflatable curved beams oriented substantially vertically,
    whereby forces generated at least at a central section of the inflatable slide portion are transferred to the substantially vertically oriented first and second inflatable curved beams to thereby structurally support at least the central section when the inflatable slide portion is at least partially spaced from a supporting surface.

* * * * *